US011650353B2

(12) United States Patent
Blacker et al.

(10) Patent No.: US 11,650,353 B2
(45) Date of Patent: May 16, 2023

(54) CUT PATTERN FOR FILM

(71) Applicant: Vision Ease, LP, Ramsey, MN (US)

(72) Inventors: Richard Blacker, North Oaks, MN (US); Lance Andersen, Rogers, MN (US); James Kunkel, Monticello, MN (US); David Olund, Stanchfield, MN (US)

(73) Assignee: HOYA Optical Labs of America, Inc., Lewisville, TX (US)

( * ) Notice: Subject to any disclaimer, the term of this patent is extended or adjusted under 35 U.S.C. 154(b) by 770 days.

(21) Appl. No.: 16/687,503

(22) Filed: Nov. 18, 2019

(65) Prior Publication Data

US 2020/0088910 A1    Mar. 19, 2020

Related U.S. Application Data

(62) Division of application No. 14/616,606, filed on Feb. 6, 2015, now abandoned.

(60) Provisional application No. 61/937,428, filed on Feb. 7, 2014.

(51) Int. Cl.
| | |
|---|---|
| *G02B 1/10* | (2015.01) |
| *B29D 11/00* | (2006.01) |
| *B29K 69/00* | (2006.01) |
| *B29C 45/37* | (2006.01) |
| *B29L 11/00* | (2006.01) |

(52) U.S. Cl.
CPC .......... *G02B 1/10* (2013.01); *B29D 11/00009* (2013.01); *B29D 11/00307* (2013.01); *B29C 45/372* (2013.01); *B29K 2069/00* (2013.01); *B29L 2011/0016* (2013.01); *Y10T 83/04* (2015.04)

(58) Field of Classification Search
CPC ................ G02B 1/10; B29D 11/00009; B29D 11/00307; B29C 45/372; B29K 2069/00; B29L 2011/0016; Y10T 83/04
USPC ......................................................... 264/1.7
See application file for complete search history.

(56) References Cited

U.S. PATENT DOCUMENTS

| | | | |
|---|---|---|---|
| 7,938,536 B2 | 5/2011 | Cano et al. | |
| 8,066,371 B2 | 11/2011 | Miyoshi et al. | |
| 2004/0125335 A1 | 7/2004 | Vu | |
| 2004/0126587 A1 | 7/2004 | Maki et al. | |
| 2006/0157191 A1 | 7/2006 | Matsuo et al. | |
| 2008/0182069 A1 | 7/2008 | Hoshi et al. | |
| 2009/0308033 A1 | 12/2009 | Ekberg et al. | |
| 2010/0007847 A1 | 1/2010 | Cano et al. | |
| 2010/0130246 A1 | 5/2010 | Biertumpfel et al. | |
| 2012/0281302 A1 | 11/2012 | Penniman | |
| 2012/0327524 A1 | 12/2012 | Shigemitsu et al. | |

(Continued)

FOREIGN PATENT DOCUMENTS

| | | | |
|---|---|---|---|
| JP | 2001094127 A | 4/2001 | |
| JP | 2006003522 A | 1/2006 | |
| JP | 2013068872 A | 4/2013 | |

(Continued)

OTHER PUBLICATIONS

China Patent Office, Office Action dated Aug. 1, 2018 with English translation in Chinese Patent Application No. 201580017883.X, 17 pages.

(Continued)

*Primary Examiner* — William Choi
(74) *Attorney, Agent, or Firm* — Inskeep IP Group, Inc.

(57) ABSTRACT

A cut pattern for a film or film laminate used in the fabrication of optical articles such as lenses.

17 Claims, 12 Drawing Sheets

(56) References Cited

U.S. PATENT DOCUMENTS

2013/0314798 A1    11/2013   Kobayashi et al.
2014/0205801 A1    7/2014    Iwata et al.

FOREIGN PATENT DOCUMENTS

KR    20080106273 A    12/2008
WO    WO2015120338 A1    8/2015

OTHER PUBLICATIONS

China Patent Office, Reexamination of Office Action dated Feb. 4, 2021 with English translation in Chinese Patent Application No. 201580017883.X, 15 pages.
Korea Patent Office, Office Action dated Nov. 19, 2020 with English translation in Korean Patent Application No. 10-2016-7022794, 12 pages.
Machine translation of JP 2013/068872 A, obtained from Industrial Property Digital Library of the JPO on Aug. 21, 2017.
WIPO, U.S. International Search Authority, International Search Report and Written Opinion dated Jun. 26, 2015 in International Patent Application No. PCT/US2015/014924, 11 pages.
American Heritage Dictionary, Definition of the term "Stamp". Retrieved on Feb. 5, 2017.

Fig. 1

PRIOR ART

Fig. 2

PRIOR ART

CUT PATTERN FOR FILM

RELATED APPLICATIONS

This application is a divisional of U.S. patent application Ser. No. 14/616,606 filed Feb. 6, 2015 entitled Cut Pattern For Film, which claims benefit of priority to U.S. Provisional Application Ser. No. 61/937,428 filed Feb. 7, 2014, entitled Cut Pattern For Film, which is hereby incorporated herein by reference in its entirety.

FIELD OF THE INVENTION

The present invention is directed toward optical films and film laminates and, more particularly, to the preparation of films and film laminates for use in producing optical articles such as lenses.

BACKGROUND OF THE INVENTION

Films and film laminates are employed to manufacture optical lenses, for example ophthalmic lenses and sun glass lenses, to impart optically functional characteristics to the lenses. The optical functional characteristics imparted may include photochromic properties, polarizing properties, anti-reflective properties, hard or protective properties, hydrophobic or hydrophilic properties, and/or various tinting or coloration properties.

Conventionally, when films or film laminates are employed during the formation of circular lenses or lens blanks, for example through injection molding and casting techniques, circular forms of a film or film laminate are cut from flat sheets of film or film laminate. Once cut, the individual cut forms of the film or film laminate are referred to as wafers. The diameter of the circular wafer is determined based upon the size of the lens blank being formed, the type of lens being formed, and certain properties of the equipment in which the lenses are to be formed.

Figure 1:
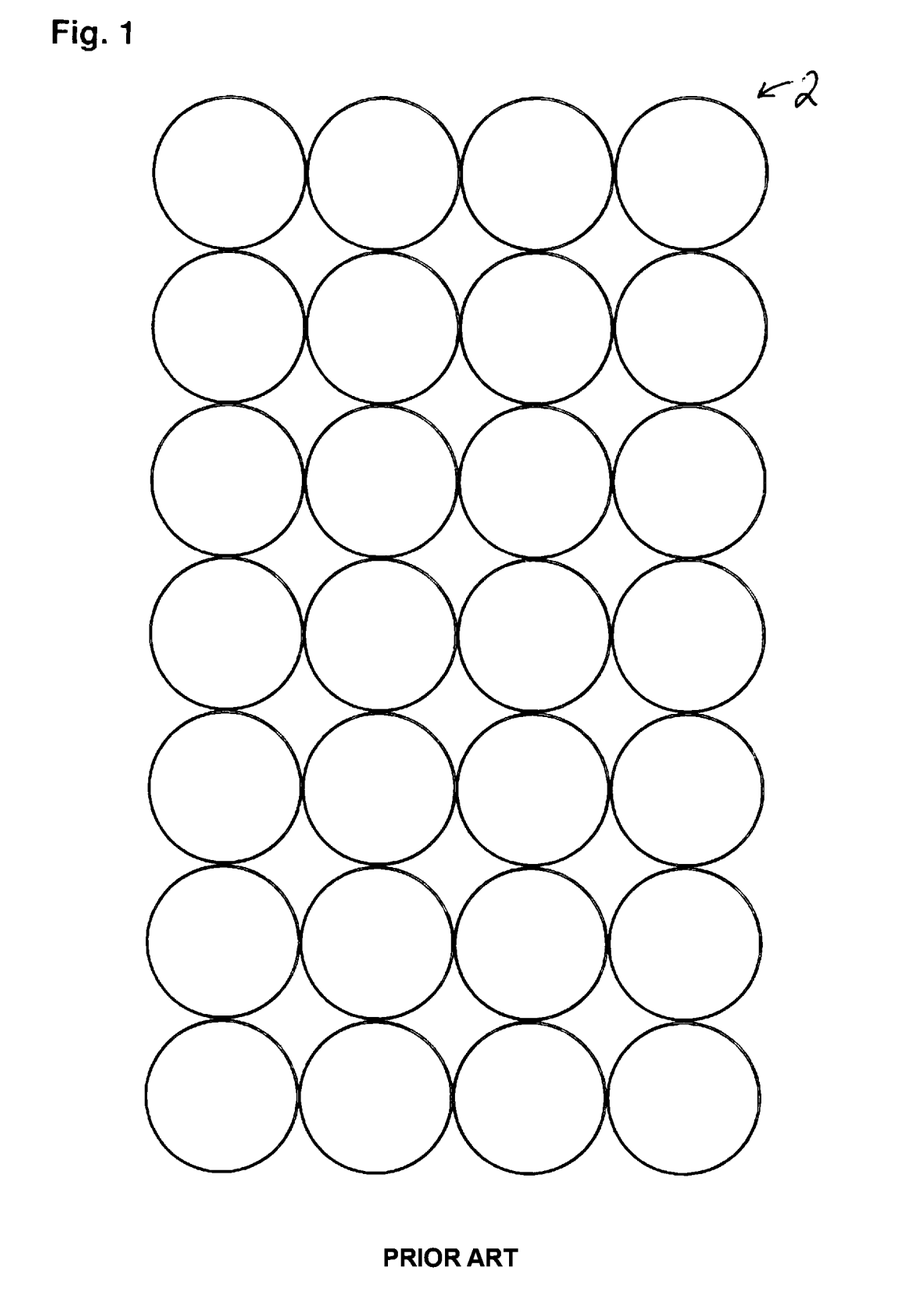
FIG. 1 is a view of an example of a conventional film or film laminate sheet cut pattern.
Figure 2:
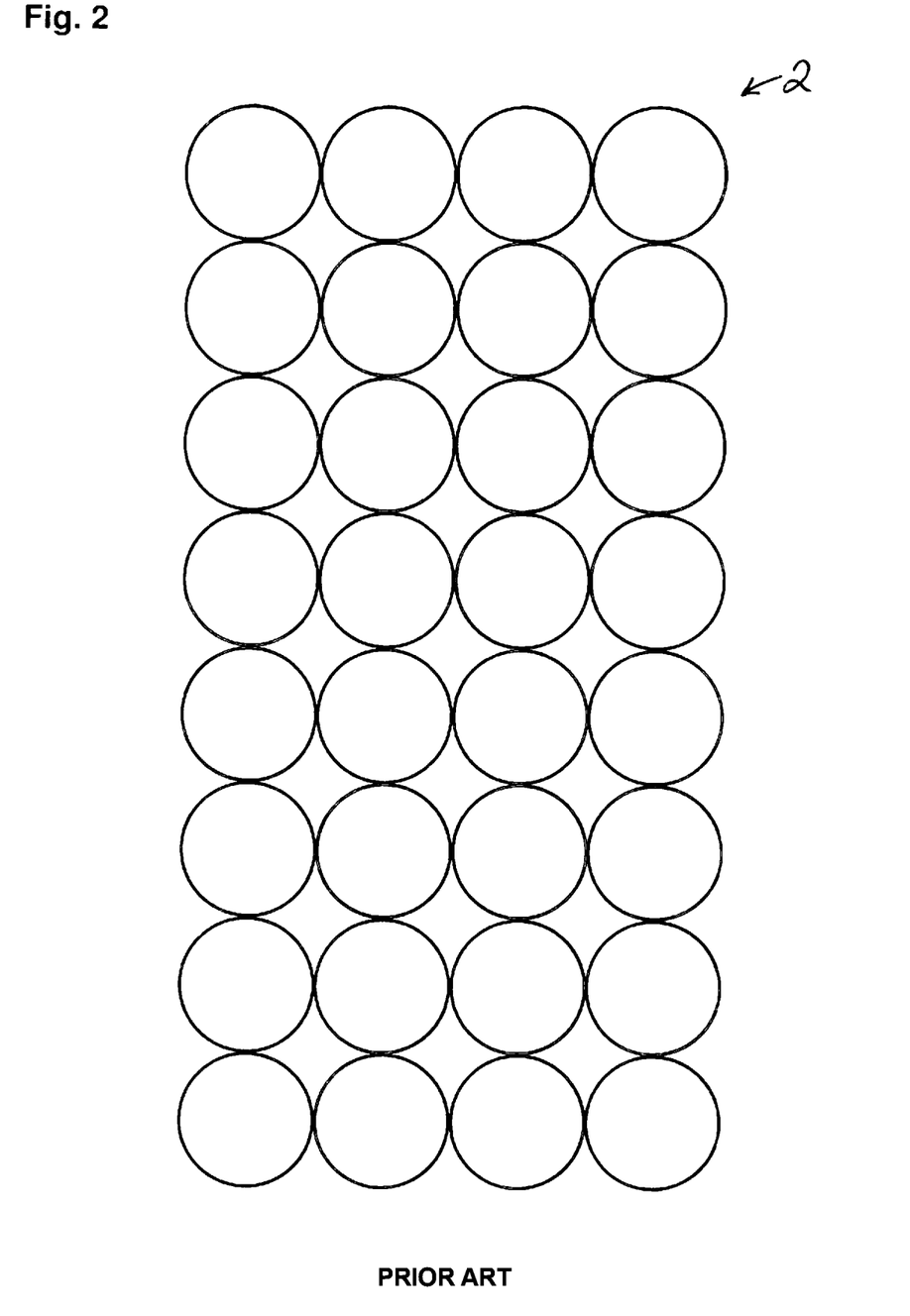
FIG. 2 is a view of an example of a conventional film or film laminate sheet cut pattern.

The film or film laminate from which the wafers are cut is typically provided in a flat sheet. For example, a square pattern of circular wafers may be cut from a rectangular sheet of film or film laminate using a cutting plate. FIGS. 1 and 2 show examples of a conventional, film or film laminate sheet cut pattern 2 for the formation of circular wafers of different diameters, for example of circular wafers having a diameter of 86 and 76 millimeters, respectively.

In order to minimize imperfections resulting from the cutting of the sheet, a space, for example 0.03125 inches, is maintained between each adjacent wafer cut from the sheet. The area of the film or film laminate sheet remaining after the wafers have been cut is referred to as "weed." In certain configurations, one disadvantage of the above-described conventional method for forming wafers is that the weed can amount to as much as 30 percent of the area of the original uncut film or film laminate sheet. Hence, in view of the substantial costs associated with acquiring certain optically functional films and film laminates, significant cost saving could be realized if techniques for reducing the weed were achieved.

In many cases, prior to employing a flat, circular wafer in the formation of a lens, the flat, circular wafer is per-formed or manipulated into a curved or cup-like shape that is similar to the curvature of a front surface of the lens to be formed. The wafer can be formed into this curved shape by various techniques such as the application of vacuum and heat. The distortion of the flat, circular shaped wafer in to a curved, circular wafer often leads to a radial fold formed in the film or film laminate of the wafer. The fold occurs in order to accommodate the distortion and/or material stress of the initially flat wafer. This fold can be visible in higher base curve lenses thus leading to product waste due to poor or unacceptable quality lens. Hence, in view of the substantial costs associated with forming high quality lenses, significant cost savings could be realized if techniques for reducing this fold in the curved wafer were achieved.

OBJECTS AND SUMMARY OF THE INVENTION

The present invention improves efficiency and quality of forming film and film laminate wafers for use in the fabrication of optical articles such as single and multifocal lenses. These improvements are achieved, in part, by providing a cut pattern for the formation of film wafers for making optical articles comprising a plurality of individual wafer templates each having six sides of equal length and a series of rows and columns in which the plurality of individual wafers are arranged such that each of the six sides of an individual wafer template of said plurality of individual wafer templates is adjacent and parallel to a side of a different wafer template of said plurality of individual wafer templates.

In certain other embodiments, these improvements are achieved by providing a wafer for use in the formation of a circular optical article comprising six sides of equal length and a maximum dimension that is approximately equal to a maximum dimension of the circular optical article in which the wafer will be employed.

In certain other embodiments, these improvements are achieved by a method for forming film wafers for use in the formation of optical articles comprising: forming a single wafer template having six straight sides of equal length, an intersection of each pair of adjacent sides of said six straight sides forming a curve; duplicating the wafer template in a series of rows and columns; arranging the rows and columns of the duplicated wafer templates such that each sides of a first wafer template is adjacent and parallel to a side of a different wafer template; and using said arrangement of rows and columns of the duplicated wafer templates to cut a plurality of individual wafers from a sheet of film.

In certain other embodiments, these improvements are achieved by a method for forming an injection molded lens comprising: placing a hexagonal-shaped film wafer within a mold forming a portion of a lens mold cavity; closing the mold cavity; injecting a molten resin in the closed mold cavity; and removing the lens from the mold cavity.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The film or film laminate cut pattern of the present invention effectively reduces weed resulting from the original film or film laminate sheet while also effectively reducing the occurrence of a fold in the subsequently pre-formed, curved wafer. Generally speaking, these objectives are achieved by employing a film or film laminate sheet cut pattern that results in wafers having a regular hexagon, i.e. having a shape with six equal angles and with six sides of equal length, a hexagonal-shape, or a hexagonal-like shape. These objectives are further achieved by employing a film or film laminate sheet cut pattern that results in hexagonal-shaped wafers having curved or rounded corners.

Figure 3:
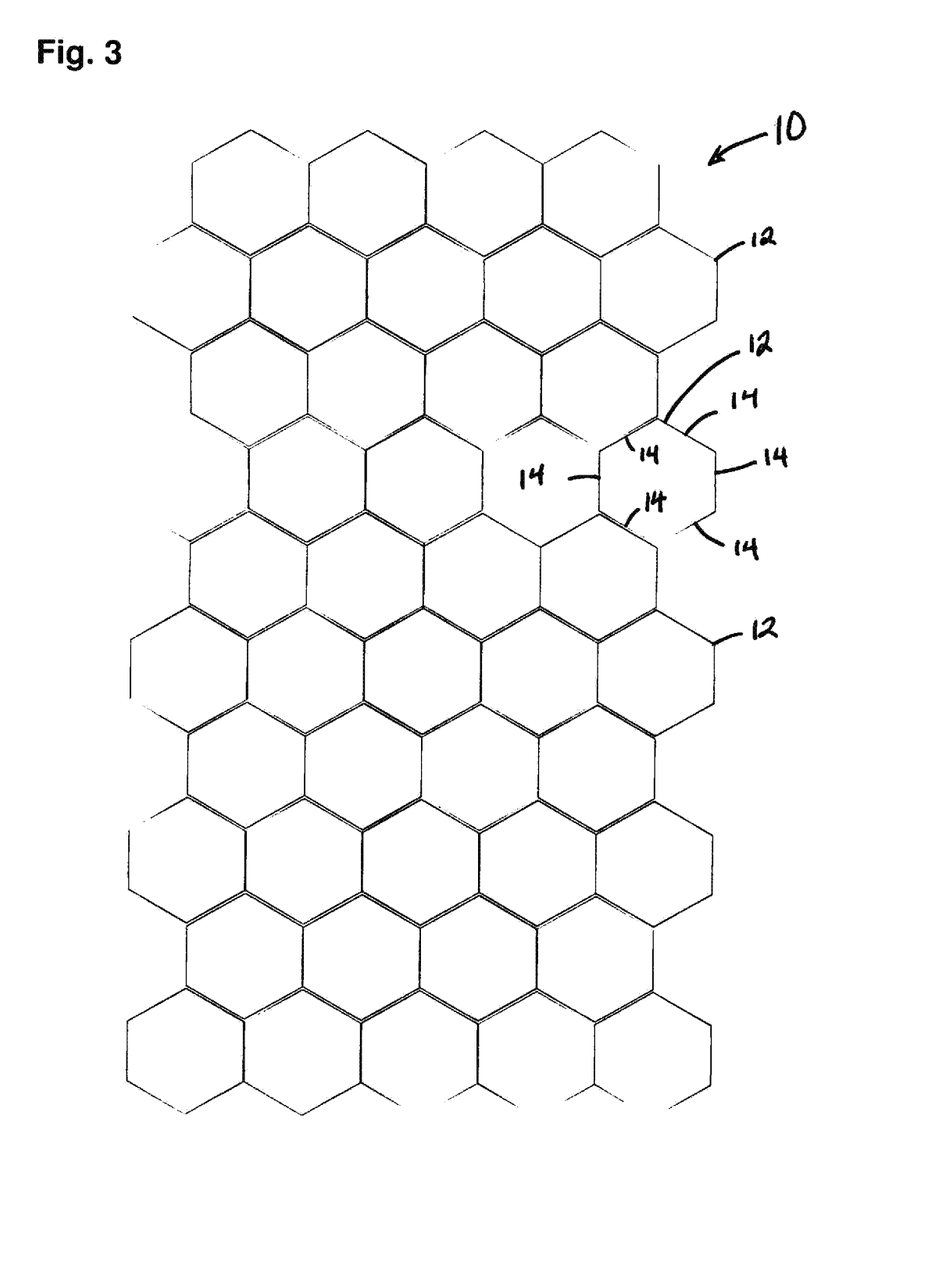
FIG. 3 is a view of a cut pattern according to one embodiment of the present invention.

FIG. 3 shows a hexagonal wafer cut pattern 10 according to the present invention. The cut pattern 10 is designed for use in the formation of circular lenses having, for example, a diameter of 86 millimeters. The sides 14 of the hexagonal wafers 12 are, for example approximately 44 millimeters. The percent of weed resulting from this cut pattern is approximately five percent.

In practice, the use of perfect or regular hexagonal wafers can be problematic for two reasons. First, in practice, after a wafer has been cut, the edges of the wafer must be cleaned of lint and other debris. Conventional wafer cleaning processes are hampered by the presence of the relatively sharp corners on a wafer formed in the shape of a perfect hexagon. However, improper edge cleaning can result in the persistence of debris on the edges of the wafer. The presence of such debris can, in turn, result in a higher percent of lenses having cosmetic failures due to the incorporation of imperfections in the lens.

Second, in the case of at least injection molded lenses, placement of the conventional circular wafers into the injection mold cavity is conducted by robot. The wafer is held in place by applying vacuum behind the wafer at specific points near the periphery of the circular wafer. Such wafer vacuum points are compromised or otherwise not present in a wafer having a perfect hexagonal shape.

In order to overcome both of these deficiencies of employing a wafer having a perfect hexagonal shape, in certain embodiments of the present invention, the otherwise perfect hexagonal shape of the wafer is altered by trimming or otherwise rounding the corners formed at the intersections of the straight sides of the hexagon and by enlarging the otherwise perfect hexagon so as to have a diameter or largest dimension approximately equal to that of the diameter of the lens in which the wafer will be employed.

Figure 4A:
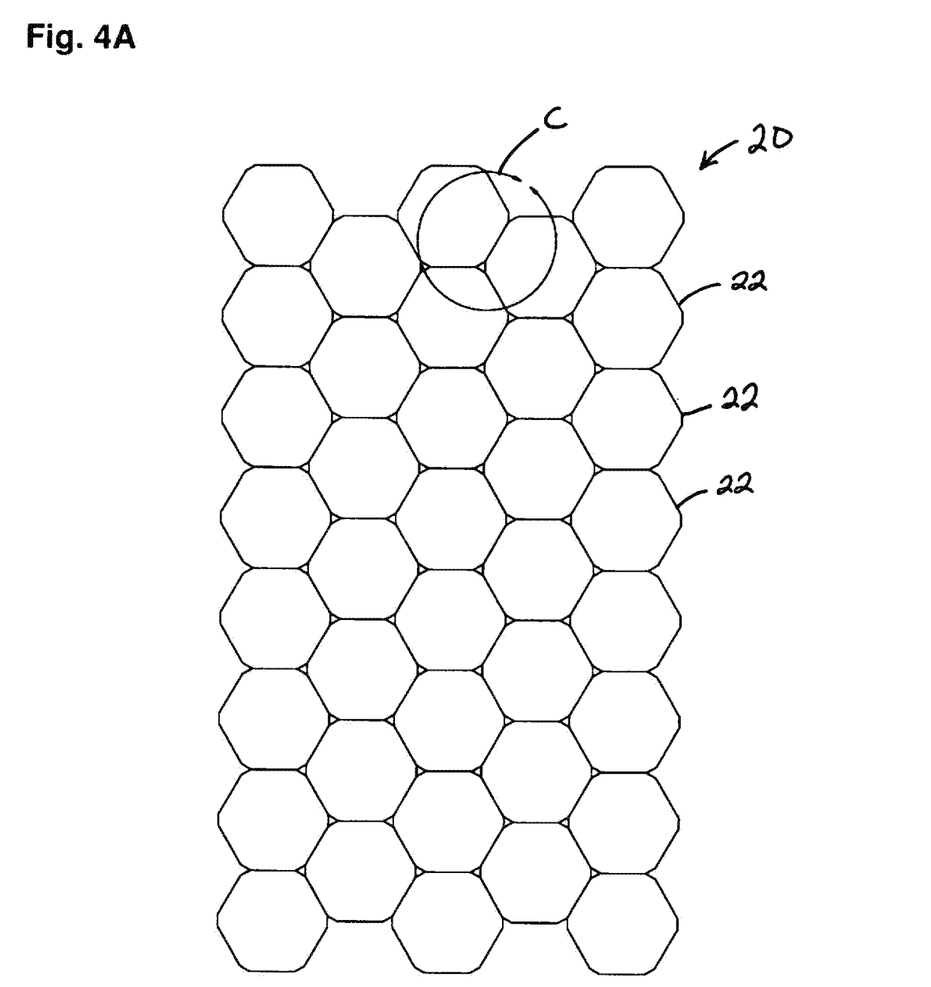
FIG. 4A is a view of a cut pattern according to one embodiment of the present invention.
Figure 4B:
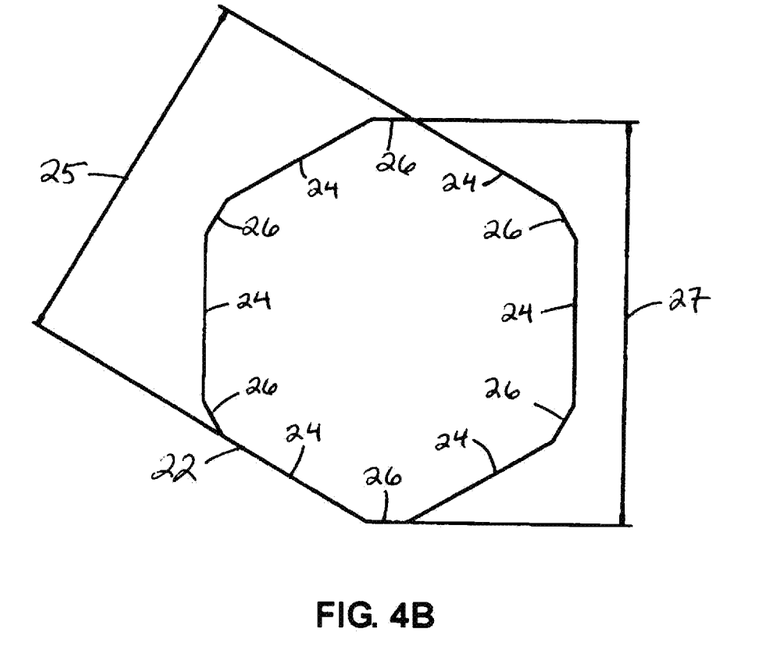
FIG. 4B is a plan view of a wafer template or wafer according to one embodiment of the present invention.
Figure 4C:
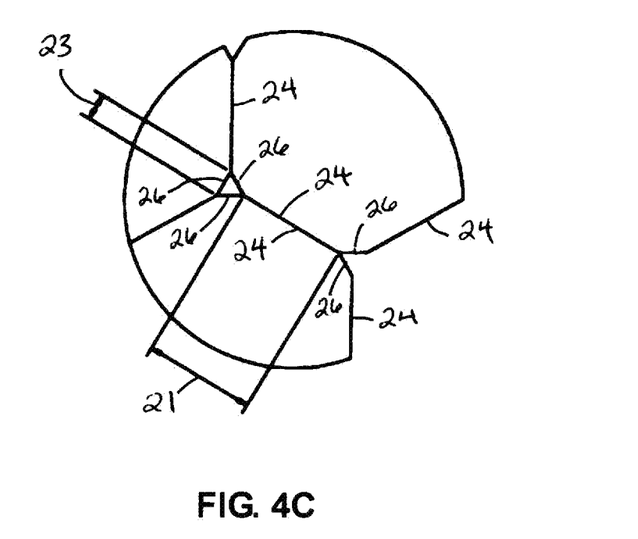
FIG. 4C is a magnified view of portion "C" of FIG. 4A of a cut pattern according to one embodiment of the present invention.

FIG. 4A shows a hexagonal-shaped wafer cut pattern 20 according to the present invention in which the corners of the otherwise perfect hexagons are trimmed at a diagonal 26 to form wafers 22. FIG. 4B is a magnified view of a single wafer 22 having a dimension 25 between opposite sides 24 of approximately 78 millimeters and a dimension 27 between opposite diagonals 26 of approximately 85.1 millimeters. FIG. 4C shows a magnified view of a portion "C" of FIG. 4A. As shown in FIG. 4C, diagonals 26 have a dimension 23 of approximately 8.6 millimeters, and sides 24 have a dimension 21 of approximately 35.1 millimeters.

Also shown in FIG. 4C, is the feature of the sides 24 of adjacent wafers 22 being "shared." Alternatively stated, the adjacent sides 24 of adjacent wafers 22 are not spaced apart or gapped and are formed by a single cut in the film or laminate film sheet.

Figure 5A:
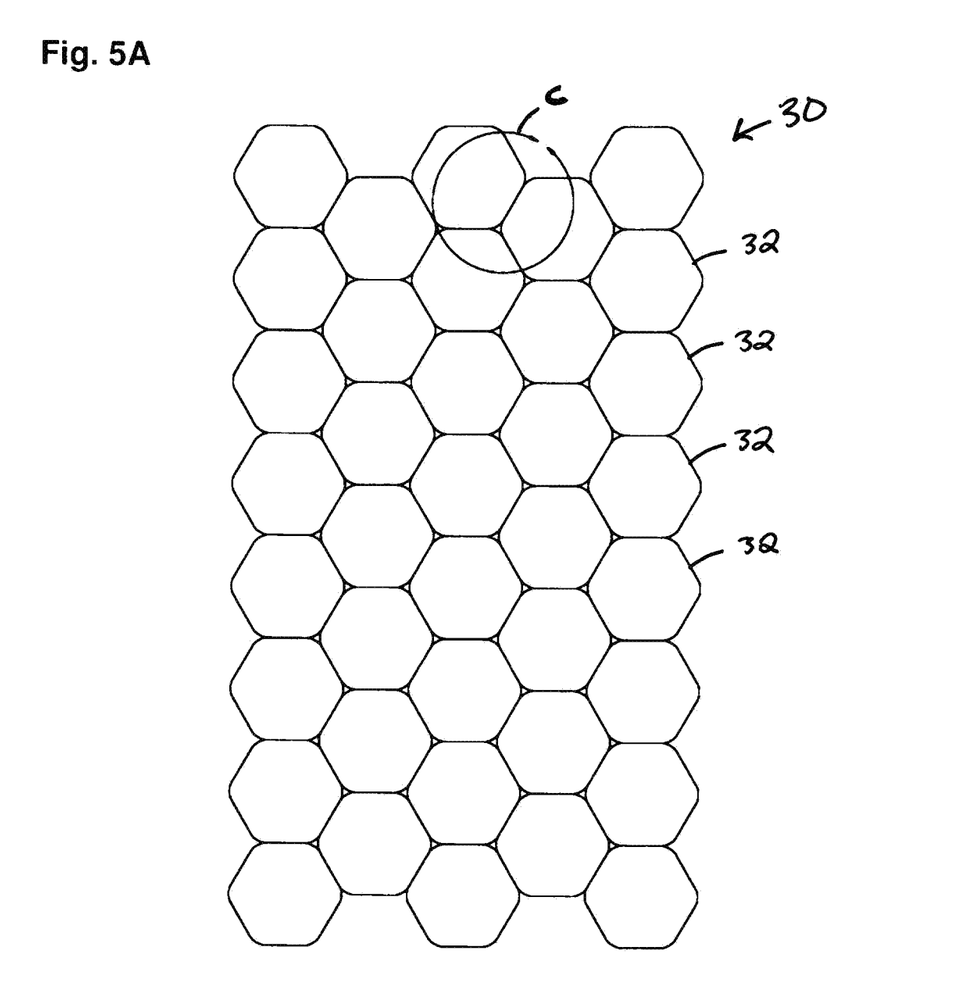
FIG. 5A is a view of a cut pattern according to one embodiment of the present invention.
Figure 5B:
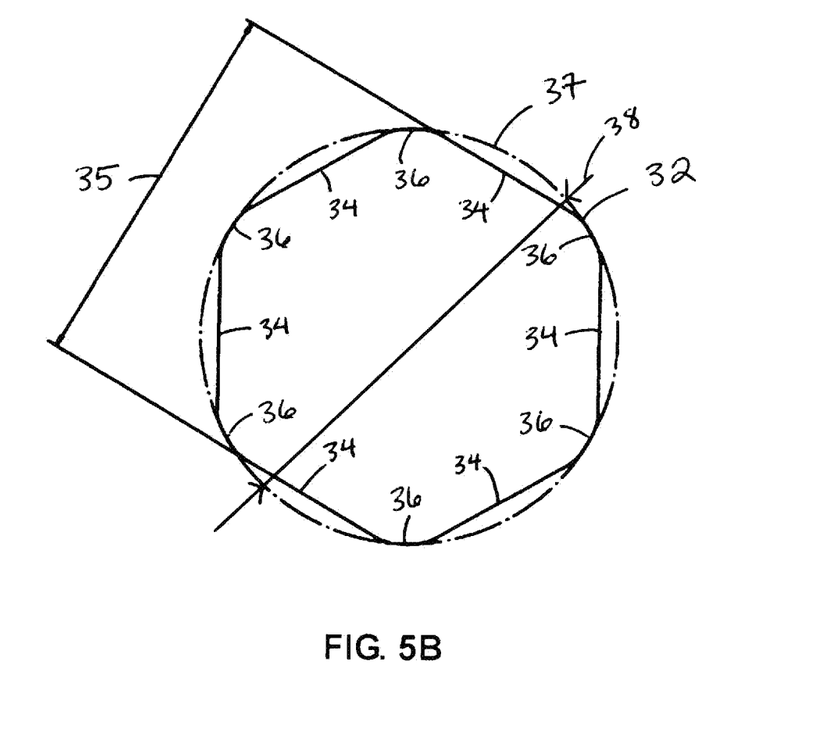
FIG. 5B is a plan view of a wafer template or wafer according to one embodiment of the present invention.

FIG. 5A shows a hexagonal-shaped wafer cut pattern 30 according to the present invention in which the corners of the otherwise perfect hexagons are trimmed so as to form curves 36 spanning between two adjacent sides 34 of the wafers 32. FIG. 5B is a magnified view of a single wafer 32 having a dimension 35 between opposite sides 34 of approximately 78 millimeters.

Figure 5C:
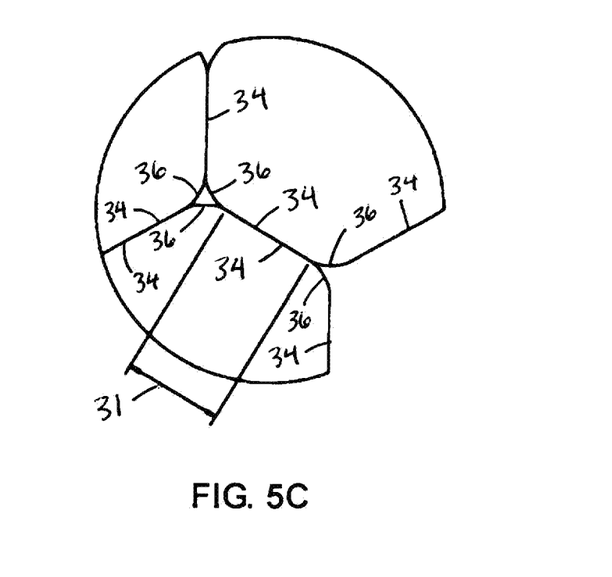
FIG. 5C is a magnified view of portion "C" of FIG. 5A of a cut pattern according to one embodiment of the present invention.

The shape or radius of the curves 36 is determined by best fitting the wafer 32 within a circle 37 having a diameter 38 of 85.55 millimeters. The circle 37 and diameter 38 are representative of a lens to be molded with the wafer 32. In other words, in the present embodiment, the curvature of the curves 36 of the wafer 32 is determined based upon a curvature of a circular lens of a desired diameter to which the wafer 32 will be molded. FIG. 5C is a magnified view of a portion "C" of FIG. 5A. As shown in FIG. 5C, sides 34 of wafer 32 have a dimension 31 of approximately 30.54 millimeters.

Also shown in FIG. 5C, is the feature of the sides 34 of adjacent wafers 32 being "shared." Alternatively stated, the adjacent sides 34 of adjacent wafers 32 are not spaced apart or gapped and are formed by a single cut in the film or laminate film sheet.

Figure 6A:
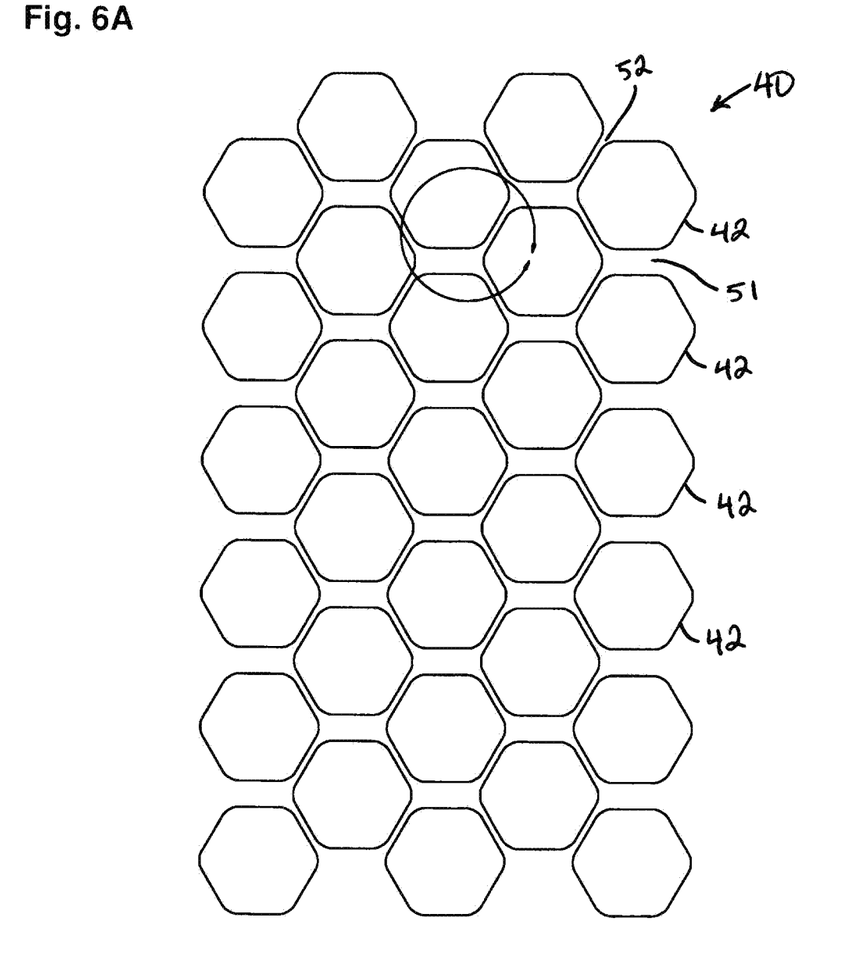
FIG. 6A is a view of a cut pattern according to one embodiment of the present invention.

FIG. 6A shows a hexagonal-shaped wafer cut pattern 40 according to the present invention in which the corners of the otherwise perfect hexagons are trimmed so as to form curves 46 spanning between two adjacent sides 44 of the wafers 42. The wafer cut pattern 40 employs first gaps or spaces 51 and second gaps or spaces 52 between the sides 44 of the individual different wafers. While such first spaces 51 and second spaces 52 may result in increased weed, such a pattern may be desired in certain situations due to limitations in, for example, wafer cutting mechanisms; limitations in available film or film laminate sheet sizes; and/or the film's or film laminate's physical properties.

Figure 6B:
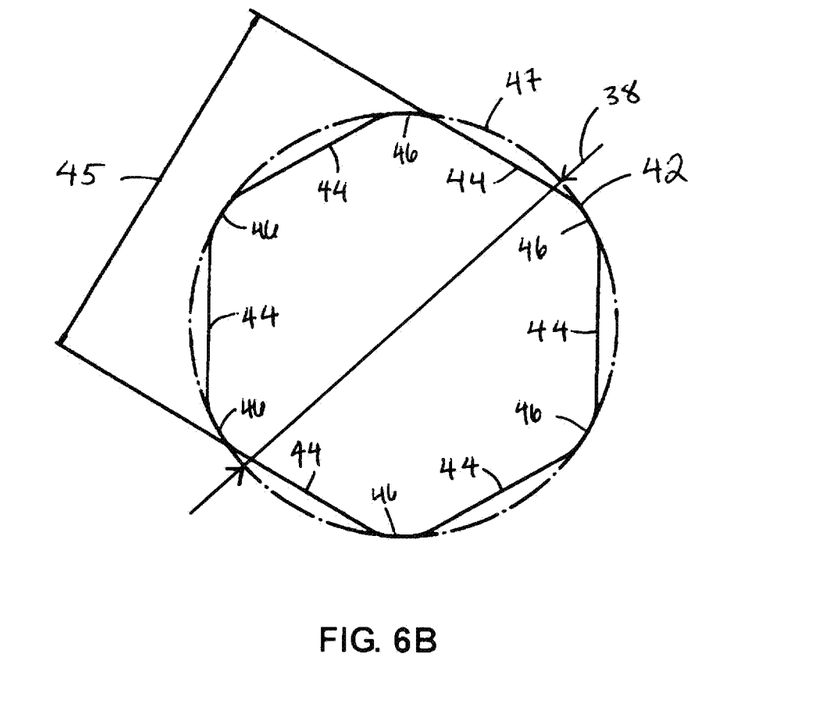
FIG. 6B is a plan view of a wafer template or wafer according to one embodiment of the present invention.
Figure 6C:
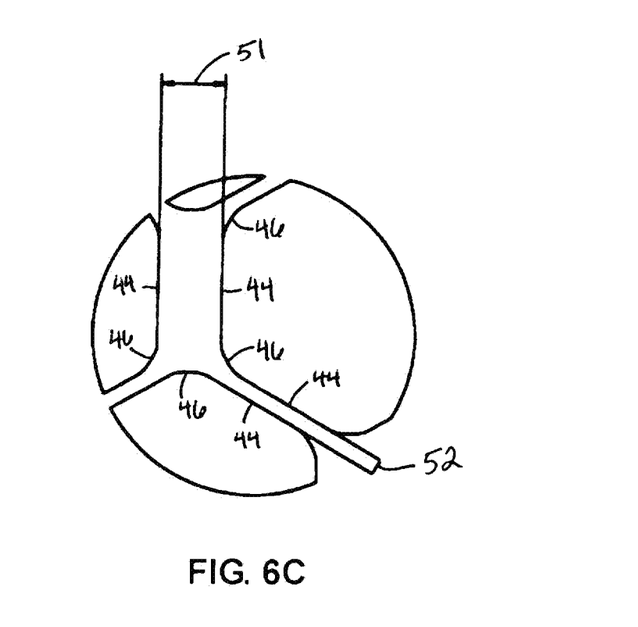
FIG. 6C is a magnified view of portion "C" of FIG. 6A of a cut pattern according to one embodiment of the present invention.

FIG. 6B is a magnified view of a single wafer 42 having a dimension 45 between opposite sides 44 of approximately 78 millimeters. The shape or radius of the curves 46 is determined by best fitting the wafer 42 within a circle 47 having a diameter 38 of approximately 85.55 millimeters. The circle 47 and diameter 38 are representative of a lens to be molded with the wafer 42. In other words, in the present embodiment, the curvature or radius of the curves 46 of the wafer 42 is determined based upon a radius or curvature of a circular lens of a desired diameter to which the wafer 42 will be molded. FIG. 6C is a magnified view of a portion of area "C" of FIG. 6A. As shown in FIG. 6C, first spaces 51 and second spaces 52 may employ different dimensions. For example, as shown in FIGS. 6A and 6C, first spaces 51 may have a dimension of approximately 19 millimeters and second spaces 52 may have a dimension of approximately three sixteenths of an inch.

Figure 6D:
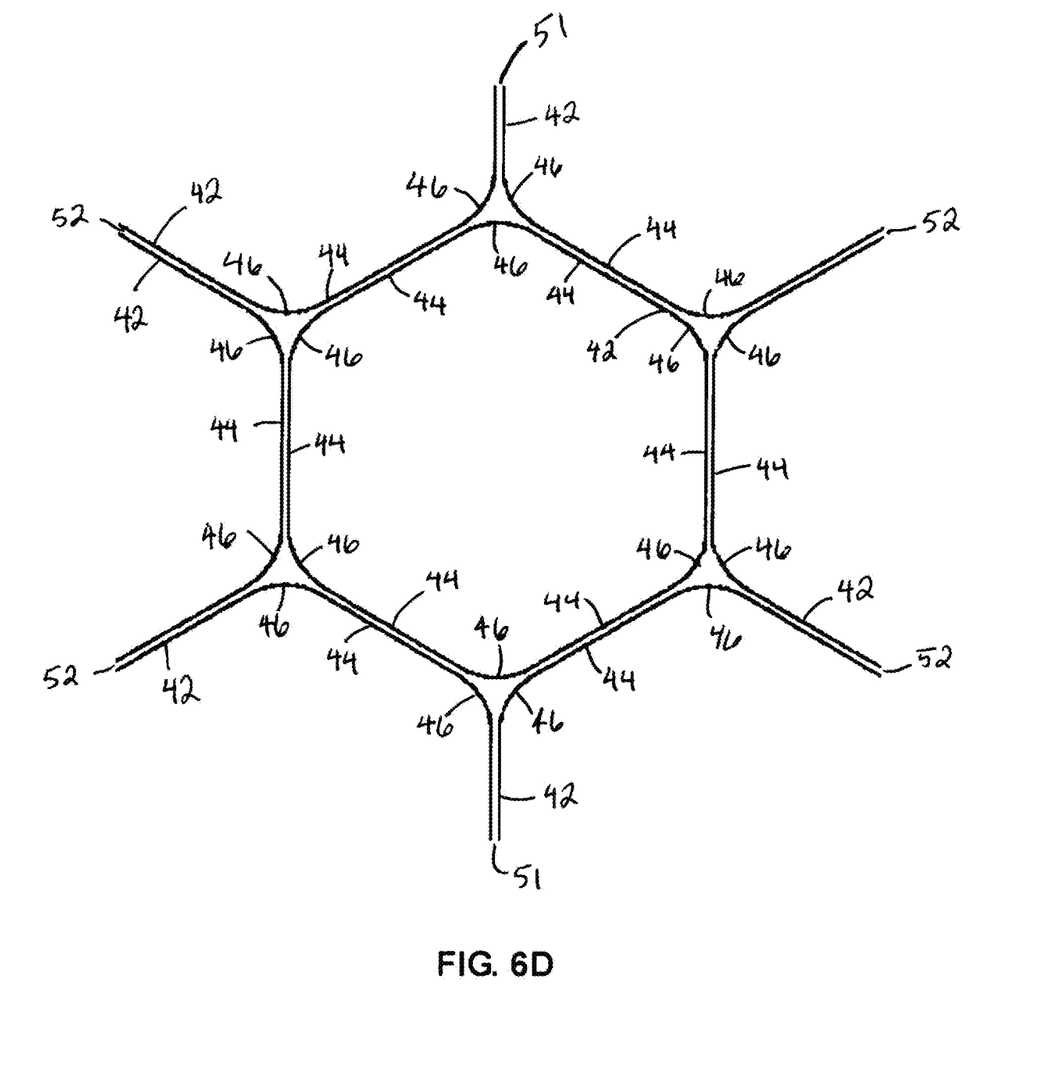
FIG. 6D is a partial view of a cut pattern according to one embodiment of the present invention.

Alternatively, as shown in FIG. 6D, in certain embodiments of the present invention, spacing 51 and spacing 52 may have equal or approximately equal dimensions, for example 1.15 millimeters. The dimensions of the spacing 51 and the spacing 52 may, for example, be in the range of 0.4 millimeters to 30 millimeters, regardless of whether there is a differential between the dimensions of spacing 51 and spacing 52.

For the sake of clarity, each of hexagonal-shapes or wafers 12, 22, 32, 42 shown in FIGS. 3, 4A, 4B, 5A, 5B, 6A, and 6B may represent a template of an area from which an individual wafer has yet to be cut; a void left after an individual wafer has been removed from a portion of a film laminate sheet; or a cut wafer remaining after the surrounding unused portion of a film laminate sheet has been removed.

Figure 7:
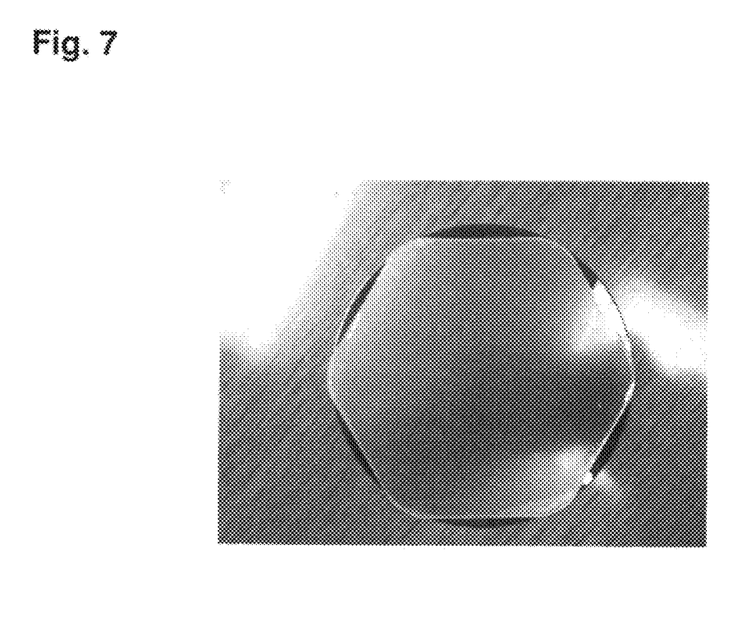
FIG. 7 is an image of a hexagonal-shaped wafer according to the present invention resting on top of a conventional, round wafer.

By way of comparison, FIG. 7 shows a wafer 30 or 40 according to the present invention resting upon or over a conventional, circular wafer. Both wafers are intended for use in the molding of circular lenses having the same diameter.

In operation, according to certain embodiments of the present invention, a template or shape for an individual film or film laminate wafer is formed depending on, for example the size of the optical article, for example a single or multifocal lens. A cut pattern is then formed by duplicating the wafer template and arranging the duplicated template wafers in columns and rows so as to achieve the desired balance between efficient use of the sheet of film or film laminate from which the wafers will be cut and wafer quality. The individual wafers are then cut from the sheet of film or film laminate, the edges of the wafers are cleaned, and the individual wafers are pre-formed if desired depending on the intended application.

Prior to the molding of an optical article, an individual wafer is then inserted or placed within a mold forming a side of a mold cavity. The wafer may, but need not necessarily be held into place within the mold by a friction fit within the mold. The mold cavity is then closed and a molten optical substrate, for example a polycarbonate resin, is injected into the closed mold cavity. The mold cavity is cooled, the cavity opened and the molded optical article is removed. Depending upon the exact placement of the wafer within the mold or mold cavity the wafer may form a front or back surface of the optical article or may be embedded within an interior of the optical article.

Figure 8:
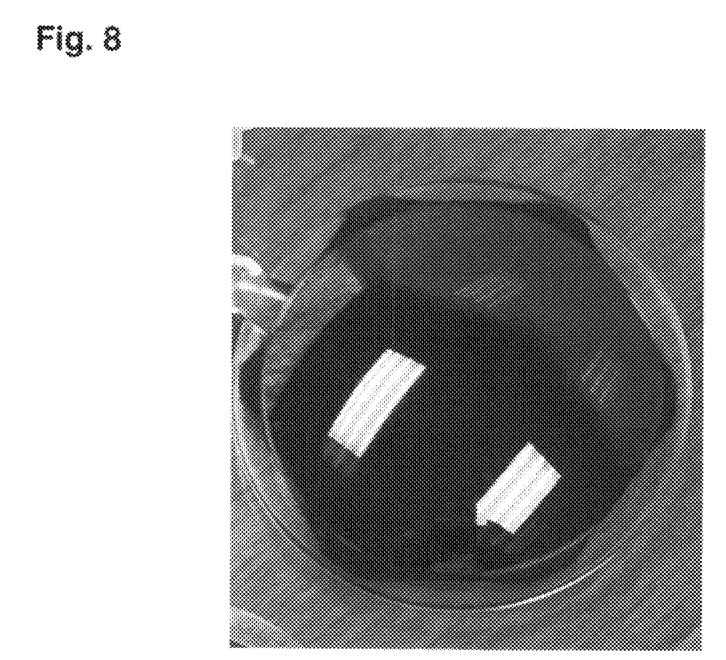
FIG. 8 is an image of a lens employing a hexagonal-shaped wafer according to the present invention

FIG. 8 shows an optical article in the form of a single focal lens molded with a wafer 30 or 40 according to the present invention.

The hexagonal-shaped wafers according to the present invention are advantageous over conventional, circular wafers in several regards. First, hexagonal-shaped wafers according to the present invention allow for film or film laminate sheet cutting patterns that result in significantly less production of weed or wasted, unused film or film laminate sheet area. The advantage of this optimization are realized most significantly in the reduced waste of functional laminate components such as tinting dyes, photochromic dyes, and polarization layers.

The hexagonal-shaped wafers of the present invention further advantageously provide for the continued utilization of edge cleaning techniques already in practice. Accordingly, employing the hexagonal-shaped wafers of the present invention does not necessitate development of new edge cleaning techniques.

The hexagonal-shaped wafers of the present invention also advantageously provide for the continued utilization of robotic handling of the inventive wafers during utilization in the lens manufacturing process.

The hexagonal-shaped wafers of the present invention advantageously decrease the occurrence of wafer folding during the process of pre-forming curved wafers. The hexagonal shape of the wafers of the present invention does not experience the same distortion and/or material stress during formation of a curved wafer from an initially flat wafer as exhibited when employing conventional circular wafers. Employing the hexagonal-shaped wafers of the present invention thereby decreases the occurrence of the wafer fold observed in higher base curve lenses formed from circular wafers. Accordingly, less product is wasted due to poor or unacceptable lens quality and production costs are thereby decreased.

In addition to the above advantages, according to certain embodiments of the present invention, cutting the inventive hexagonal-shaped wafers to the size of the mold cavity of the lens in which the wafer will be employed allows for a friction fit or placement of the wafer within the mold. Furthermore, the number of contact points of the inventive hexagonal-shaped wafers within the mold is advantageously reduced relative to a conventional round wafer which reduces the particulates generated and results in a higher yield of acceptable lenses.

Additionally, the inventive hexagonal-shaped wafers advantageously allow for the wafer to be more sealed within a lens blank thereby reducing the chance of contamination from film or film laminate bleeding. This may be especially beneficial with lenses that will be coated as it may result in reduced particulates in coating. Additionally, the edge of the resulting lens is smoother due to lack of bleeding, for example polymer bleeding, along the edge of the wafer and lens. Accordingly, lens forming cavities may be maintained cleaner thereby leading to fewer defects and reduced coater defects.

Furthermore, the hexagonal-shaped wafers of the present invention may be less susceptible to film oil which effects where air bubbled may form and be trapped around the wafer; a common defect seen in low base lenses. The present wafers also more easily facilitate recognition of an undesirable wafer drop or deflection and the presence of a wafer in an unfinished lens.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method of reducing weed in a film sheet used in the formation of a circular optical article comprising:
    providing a film sheet having an optical functional property selected from a group consisting of: photochromic properties, polarizing properties, antireflective properties, hydrophobic properties, hydrophilic properties, and coloration properties;
    identifying a diameter of said circular optical article;
    forming said film sheet into a plurality of hexagonal-shaped wafers;
    forming a radius at corners of said hexagonal-shaped wafers, said radius being based on the identified diameter of said circular optical article.

2. The method of claim 1, wherein said forming of said film sheet includes forming said wafers with six equal sides.

3. The method of claim 2, wherein said forming includes forming each of the six sides of said hexagonal-shaped wafers to be straight.

4. The method of claim 1, wherein said providing of a film sheet comprises providing a film sheet with two film layers, each layer having a functional property selected from a group consisting of: photochromic properties, polarizing properties, antireflective properties, protective properties, hydrophobic or hydrophilic properties, and coloration properties.

5. The method of claim 1, wherein identifying a diameter comprises selecting a diameter of said circular optical article in the range of 76 to 86 millimeters.

6. The method of claim 1, further comprising shaping said plurality of hexagonal-shaped wafers to have a curved major surface.

7. The method of claim 1, wherein said reducing said weed comprises reducing weed to approximately five percent.

8. A method of forming an optical film wafer for use in the formation of a circular optical article comprising:
    providing a film sheet having at least one functional property;
    identifying a diameter of said circular optical article;
    cutting from said sheet at least one hexagonal-shaped wafer;
    trimming corners of said at least one hexagonal-shaped wafer at a diagonal;
    a maximum diameter of said at least one hexagonal-shaped wafer after said trimming being approximately equal to said identified diameter of said circular optical article.

9. The method of claim 8, wherein said providing a film sheet includes providing a film sheet having at least one functional property selected from a group consisting of: photochromic properties, polarizing properties, antireflective properties, hydrophobic or hydrophilic properties, and coloration properties.

10. The method of claim 8, wherein said providing a film sheet includes providing a film second film laminated to said film sheet.

11. The method of claim 8, wherein identifying a diameter includes selecting a diameter of said circular optical article in a range of 76 to 86 millimeters.

12. A method for forming film wafers for use in the formation of circular optical articles comprising:
    forming a single wafer template having a hexagonal shape wherein corners of said hexagonal shape are formed to reduce weed of a film sheet so that a diameter of any two diagonal corners is the same as an identified diameter of the circular optical articles;
    duplicating the wafer template;
    arranging rows and columns of the duplicated wafer templates on said film sheet such that each side of a first wafer template is adjacent and parallel to a side of a different wafer template; and
    following said arrangement of rows and columns of the duplicated wafer templates to cut a plurality of individual film wafers from said sheet of film.

13. The method of claim 12, wherein the step of forming a single wafer template having said hexagonal shape wherein corners of said hexagonal shape are formed to reduce weed of said film sheet wherein said radius is formed based on an identified diameter of said circular optical articles.

14. The method of claim 12, wherein the step of arranging the rows and columns of the duplicated wafer templates comprises arranging the rows and columns of the duplicated wafer templates such that each side of the first wafer template is shared with the side of the different wafer template.

15. The method of claim 12, wherein the step of arranging the rows and columns of the duplicated wafer templates comprises arranging the rows and columns of the duplicated wafer template such that each side of the first wafer template is spaced apart from the side of the different wafer template.

16. The method of claim 12, wherein the step of arranging the rows and columns of the duplicated wafer templates comprises arranging the rows and columns of the duplicated wafer templates such that a spacing between rows of the duplicated wafer templates is less than a spacing between columns of the duplicated wafer templates.

17. The method of claim 12, wherein the step of following said arrangement of rows and columns of the duplicated wafer templates to cut individual film wafers from said sheet of film comprises cutting individual film wafers from a sheet of film laminate.

* * * * *